United States Patent
Mahmoud et al.

(10) Patent No.: US 9,336,251 B2
(45) Date of Patent: May 10, 2016

(54) SYSTEM AND METHOD FOR SLA-AWARE DATABASE CONSOLIDATION USING PER-TENANT MEMORY SIZE CONFIGURATION

(71) Applicant: NEC Laboratories America, Inc., Princeton, NJ (US)

(72) Inventors: Hatem Abdelghani Mahmoud, Santa Barbara, CA (US); Hyun Jin Moon, Newark, CA (US); Yun Chi, Monte Sereno, CA (US); Vahit Hakan Hacigumus, San Jose, CA (US)

(73) Assignee: NEC Corporation (JP)

( * ) Notice: Subject to any disclaimer, the term of this patent is extended or adjusted under 35 U.S.C. 154(b) by 221 days.

(21) Appl. No.: 13/683,849

(22) Filed: Nov. 21, 2012

(65) Prior Publication Data

US 2013/0212064 A1    Aug. 15, 2013

Related U.S. Application Data

(60) Provisional application No. 61/563,160, filed on Nov. 23, 2011.

(51) Int. Cl.
*G06F 17/30* (2006.01)

(52) U.S. Cl.
CPC .................. *G06F 17/30306* (2013.01)

(58) Field of Classification Search
CPC ................................ G06F 17/30306
USPC .......................... 707/609, 610, 611
See application file for complete search history.

(56) References Cited

U.S. PATENT DOCUMENTS

| | | | |
|---|---|---|---|
| 2002/0112065 A1* | 8/2002 | Denecheau | H04L 12/433 709/230 |
| 2004/0111509 A1* | 6/2004 | Eilam | H04L 67/1008 709/224 |
| 2005/0018611 A1* | 1/2005 | Chan | H04L 41/147 370/241 |
| 2005/0060590 A1* | 3/2005 | Bradley | G06F 9/5077 713/320 |
| 2005/0114534 A1* | 5/2005 | Lee | H04L 67/1002 709/230 |
| 2005/0192822 A1* | 9/2005 | Hartenstein | G06Q 10/109 705/319 |
| 2008/0046266 A1* | 2/2008 | Gudipalley | G06Q 10/00 370/230 |
| 2010/0077449 A1* | 3/2010 | Kwok | G06F 9/5027 726/3 |
| 2010/0235495 A1* | 9/2010 | Petersen | H04L 63/1458 709/224 |
| 2010/0306382 A1* | 12/2010 | Cardosa | G06F 9/5044 709/226 |
| 2011/0191461 A1* | 8/2011 | Dasgupta | G06F 15/173 709/224 |
| 2011/0283266 A1* | 11/2011 | Gallagher | G06F 9/44 717/130 |
| 2012/0222002 A1* | 8/2012 | Harrison | G06F 11/328 717/113 |

OTHER PUBLICATIONS

Ahmad, M., et al., "Interaction-aware Scheduling of Report-generation Workloads", The VLDB Journal, vol. 20., Feb. 19, 2011, pp. 589-615.

(Continued)

*Primary Examiner* — Syed Hasan
*Assistant Examiner* — Ahmed Abraham
(74) *Attorney, Agent, or Firm* — Joseph Kolodka

(57) ABSTRACT

Systems and methods for consolidating workload on one or more computing devices, comprising: generating tenant performance profiles for at least one of a buffer memory size and a buffer warmness; assigning one or more tenants to a database management system (DBMS) instance; configuring the one or more tenants to minimize a total server count needed to host the one or more tenants; and reducing the total server count by adjusting of buffer sizes while satisfying Service Level Agreement (SLA) requirements.

10 Claims, 5 Drawing Sheets

(56) References Cited

OTHER PUBLICATIONS

Ahmad M., et al., "Predicting System Performance for Multi-tenant Database Workloads", DBTest, Jun. 13, 2011, (6 pages).

Armbrust, M., et al., "Above the Clouds: A Berkeley View of Cloud Computing", Electrical Engineering and Computer Sciences University of California at Berkeley, Technical Report No. UCB/EECS-2009-28, Feb. 10, 2009, pp. 1-23.

Aulbach, S., et al., "Multi-Tenant Databases for Software as a Service: Schema-Mapping Techniques" SIGMOD, Jun. 9-12, 2008, pp. 1195-1206.

Caprara, A., et al., "Lower Bounds and Algorithms for the 2-Dimensional Vector Packing Problem" Discrete Applied Mathematics, vol. 111, Issue 3, Aug. 1, 2001, pp. 231-262, Bologna, Italy.

Curino, C., et al., "Workload-Aware Database Monitoring and Consolidation", SIGMOD, Jun. 12-16, 2011, pp. 313-324.

De La Vega, W. F., et al., "Bin Packing Can be Solved Within 1+$\epsilon$ in Linear Time", Combinatorica, vol. 1, No. 4, May 1981, pp. 349-355.

Elmore, A., et al, "Who's Driving This Cloud? Towards Efficient Migration for Elastic and Autonomic Multitenant Databases", UCSB Computer Science Technical Report, May 2010, pp. 1-5.

Garey, M R., et al., "Resources Constrained Scheduling as Generalized Bin Packing", Journal of Combinatorial Theory (A) 2i, May 27, 1975 (1976), pp. 257-298.

Gilmore, P.C. et al. "A Linear Programming Approach to the Cutting-Stock Problem", Operations Research, vol. 9, No. 6, Nov.-Dec. 1961, pp. 849-859.

Graefe, G., The Five-Mmute Rule 20 Years Later (and Hoe Flash Memory Changes the Rules), Communications of the ACM, vol. 52, No. 7, Jul. 2009, pp. 48-59.

Gray, J., et al "The Five Minute Rule Ten Years Later, and Other Computer Storage Rules of Thumb", SIGMOD Record 26(4): Sep. 1997, pp. 63-68.

Gray, J, et al. "The 5 Minute Rule for Trading Memory for Disc Accesses and the 10 Byte Rule for Trading Memory for CPU Time", SIGMOD Record, vol. 16 Issue 3, Dec. 1987, pp. 395-398.

Hui, M., et al., "Supporting Database Applications as a Service", IEEE International Conference on Data Engineering, Mar. 29-Apr. 2, 2009, pp. 832-843.

Ozmen, O., et al, "Storage Workload Estimation for Database Management Systems", SIGMOD, Jun. 12-14, 2007, pp. 377-388.

Schaffner, J., et al. "Predicting In-Memory Database Performance for Automating Cluster Management Tasks", ICDE Conference, Apr. 11-6, 2011, pp. 1264-1275.

Schroeder, B., et al. "How to Determine a Good Mult-Programmng Level for External Scheduling", ICDE Conference, Apr. 3-11, 2006, (60 pages).

Shen, Z., et al, "CloudScale: Elastic Resource Scaling for Multi-Tenant Cloud Systems'" SOCC, Oct. 27-28, 2011, (14 pages).

Soror, A., et a. "Automatc Virtual Machine Configuration for Database Wokloads", ACM Transactons Database Systems, vol. 35, No. 1, Article 7, Feb. 2010 (47 pages).

Waldspurger, C., et al. "I/O Virtualization", Communications of the ACM, vol. 55, No. 1, Jan. 2012, pp. 66-72.

Xiong, P., et al. "Intelligent Management of Virtualized Resources for Database Systems in Cloud Environment", ICDE Conference, Apr. 2011, pp. 87-98.

\* cited by examiner

SYSTEM AND METHOD FOR SLA-AWARE DATABASE CONSOLIDATION USING PER-TENANT MEMORY SIZE CONFIGURATION

RELATED APPLICATION INFORMATION

This application claims priority to provisional application Ser. No. 61/563,160 filed on Nov. 23, 2011, incorporated herein by reference.

BACKGROUND

1. Technical Field

The present invention relates generally to database consolidation, and more particularly to lowering resource cost through Service Level Agreement (SLA)-aware database consolidation using per-tenant memory size configuration.

2. Description of the Related Art

The emergence of cloud computing has induced many new research challenges on database multitenancy. Recent research has investigated the problem of database multitenancy when the workloads of tenants are kept in main memory. For example, OnLine Transaction Processing (OLTP) workloads and in-memory OnLine Analytic Processing (OLAP) workloads have been researched to solve the problem. The assumption that all tenants on a given server must answer their queries from main memory leaves little room for optimization since the buffer size of each tenant is dictated by its working set size, and the Central Processing Unit (CPU) time is dictated by the high throughput requirements of the tenant. Furthermore, none of these solutions is optimized for OLAP workloads whose throughput Service Level Agreements (SLAs) allow for queries to be answered from disk.

Research has also been performed to investigate database multitenancy at a virtual machine level, where the allocation of CPU and memory is the main focus. However, these Virtual Machine (VM)-based methods are not directly applicable to Input/Output (IO)-bound multitenancy at least because IO virtualization technologies cannot currently achieve satisfactory IO isolation with acceptable overhead levels. Another direction of research on database multitenancy focuses on consolidation of large numbers of almost-inactive tenants by sharing the same schema among tenants. The main problem in this type of system is scalability, due to the limit on the number of tables a Database Management System (DBMS) can handle for a given schema.

SUMMARY

1. A method for consolidating workload on one or more computing devices, comprising: generating tenant performance profiles for at least one of a buffer memory size and a buffer warmness; assigning one or more tenants to a database management system (DBMS) instance; configuring the one or more tenants to minimize a total server count needed to host the one or more tenants; and reducing the total server count by adjusting of buffer sizes while satisfying Service Level Agreement (SLA) requirements.

A system for consolidating workload on one or more computing devices, comprising: a profiler configured to generate tenant performance profiles, using a processor, for at least one of a buffer memory size and a buffer warmness; one or more tenants assigned to a database management system (DBMS), the one or more tenants configured to minimize a total server count needed to host the one or more tenants; and one or more buffer pools configured to reduce the total server count through optimization of buffer sizes while satisfying Service Level Agreement (SLA) requirements.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
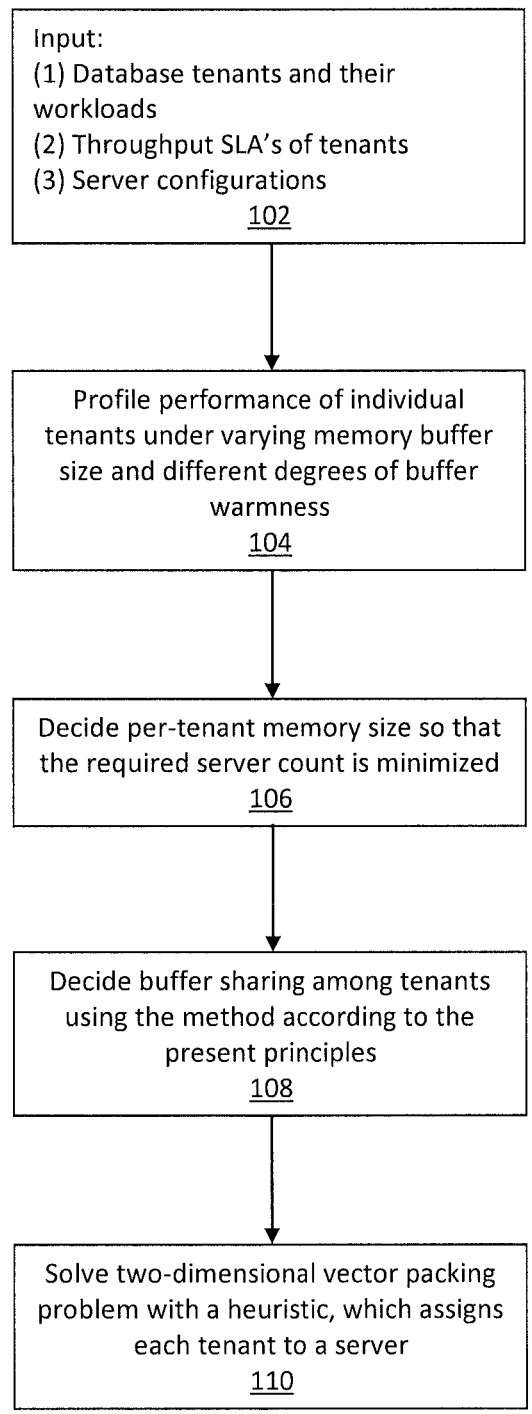
FIG. 1 is a block/flow diagram illustrating a method for workload consolidation of multiple databases in accordance with the present principles.

In accordance with the present principles, systems and methods are provided to reducing Service Level Agreement (SLA)-aware server resource demand through tenant memory buffer size and sharing optimization. Workload consolidation is an effective method to achieve cost efficiency in cloud computing. The consolidation of multiple small workloads, also known as multitenancy, can avoid significant resource waste given that many production servers are often over-provisioned for peak workload. Database services in the cloud can benefit from the same principle through database multitenancy by co-locating multiple databases on the same server. The present system/method solves the problem of multitenant database placement given pertinent Service Level Agreements (SLAs) on query throughput. Throughput SLA is defined to mean that the service provider agrees to handle queries from a particular tenant up to a given arrival rate, whereas query latency is not the main concern.

According to the present principles, the number of servers required to host a given set of tenants is minimized while continuing to meet the throughput SLA of each tenant. According to one embodiment, the present system/method allows for queries to be answered directly from disk. An example of such workloads are OnLine Analytic Processing (OLAP) queries over large data sets for periodic report generation. Tenants with such workloads derive a strong benefit from multitenancy, especially when their throughput SLAs are relatively low.

The problem of multitenancy for Input/Output (IO)-bound OLAP workloads is closely related to the "5-minute rule", which states that under the given costs for memory vs. IO bandwidth, a data item can be served either in-memory (memory resident) or though IO access (disk resident), resulting in different costs. Furthermore, there exists a break-even frequency of access that separates the regions where one choice is better than another. The present system/method extends this principle in at least two directions. First, in handling an OLAP workload (instead of a single data item or certain sequential SQL operations), there exists a continuous spectrum of configurations which are exploited according to the present principles, in addition to the choices of the 100% memory-resident and 100% disk-resident. For example, by increasing the size of the buffer pool dedicated to a workload, a portion of the IO bandwidth required by the workload is traded-off according to the present principles. Second, rather than optimizing for a single workload, the present system/method places and configures a set of tenants in a manner that minimizes the number of servers required to host tenants.

The present system/method balances memory and IO bandwidth, and is implemented to minimize the total number of servers required to host a set of tenants while meeting the throughput SLA requirements of each tenant. Various methods are employed according to the present principles to achieve this goal. One method according to the present principles is an approximation method, called Greedy Memory Reduction (GMR), that approximates globally optimum buffer sizes of tenants running on private Database Management System (DBMS) instances with a worst case approximation ratio of 3; another method is an online heuristic, called Balanced Memory Reduction (BMR); and yet another method is a heuristic called Greedy Tenant Consolidation (GTC), that consolidates tenants into shared DBMS instances whenever throughput SLAs allow, based on a profiling approach that takes into account cache warmness (where cache warmness indicates that percentage of the pages cached in the DBMS buffer pool are relevant to a given tenant that runs on that buffer pool.)

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a method for workload consolidation of multiple databases in accordance with the present principles is illustratively shown. Database tenants and their workloads, throughput SLA's of tenants, and server configurations are input in block 102. In one embodiment according to the present principles, a set W that contains 7 random workloads is generated. Each workload is comprised of 10 queries, randomly chosen from query templates of the Transaction Processing Performance Council Benchmark H (TPC-H), with randomly generated parameter values. Next, in one embodiment according to the present principles, a set P of 14 pairs of workloads randomly chosen from W are constructed. For each pair of workloads $(w_i, w_j)$ in P, the two workloads $w_i$ and $w_j$ are run in parallel and serially, and the time required to execute the workloads is compared to determine and achieve maximum throughput in block 102.

In one embodiment according to the present principles, two types of workload instances are employed. One type occurs when the two workloads $w_i$ and $w_j$ are run on the same DBMS instance, and another type occurs when the two workloads run on two different DBMS instances. For the purpose of illustration, assume that each workload operates on a database whose size is 1 gigabyte. In one embodiment according to the present principles, two buffer configurations are employed in block 104. One buffer configuration occurs when the total buffer pool size assigned to both workloads equals the total database sizes of both workloads (i.e., 2 gigabytes), and another buffer configuration occurs when the total buffer pool size assigned to both workloads equals half the total database sizes of both workloads (i.e., 1 gigabyte). Workload pairs may be executed either concurrently or sequentially according to the present principles. While two workloads and two buffer configurations are illustratively shown, it is contemplated that other numbers of workloads and/or buffer configurations may also be employed according to the present principles.

In one embodiment according to the present principles, per-tenant memory size is determined in block 106, and maximum throughput is achieved by running one workload per disk at a time; that is, no two tenants run concurrently on the same disk. Because the SLA requirements of tenants are expressed in terms of maximum throughput, the number of tenants running on each disk is restricted to one at a time in one embodiment according to the present principles. The data of tenants that are hosted by the same DBMS instance are stored on the same disk, and tenants hosted by the same DBMS instance do not run their queries concurrently according to one embodiment. Eliminating concurrency between workloads of tenants hosted by the same DBMS instance servers avoids unpredictable interactions between workloads. Therefore, in one embodiment according to the present principles, queries are directed to the same DBMS instance are executed sequentially to maximize throughput.

In one embodiment according to the present principles, interaction between tenants is restricted by avoiding query contention on the same disks and the same DBMS instances. However, tenants still affect the buffer sizes and each other's workloads as shown in block 108, and as discussed in further detail in FIG. 3. For example, assigning less buffer size to a low-throughput tenant $t_i$ slows down $t_i$, thus taking advantage of $t_i$'s low throughput and leaving more memory for other higher-throughput tenants on the same server. But, since $t_j$ takes a longer time to finish, it introduces more load on the server, and therefore leaves less time for other tenants that use the same disk and/or run on the same DBMS instance to finish their queries. Thus, there is a trade-off between memory and time resources. In another embodiment according to the present principles, tenants may also affect each other when tenants hosted by the same DBMS instance evict each other's buffered pages. For example, if two tenants $t_i$ and $t_j$ share the same DBMS instance and the working set size of each of them is greater than or equal to the buffer size of the database instance, then each tenant of them will have to retrieve all data from disk each time they answer a query in block 108. In other words, the cache will always be cold for both tenants in this embodiment. It is noted that even in the case when the cache is always cold at the beginning of each query, zero buffer should be avoided at least because a single query may re-use the data it retrieves multiple times (e.g., when performing a nested-loop join). Also, if the working set size of one of the two tenants (e.g., $t_i$) is less than the buffer size, then only a fraction of $t_j$'s cache will be evicted.

Figure 2:
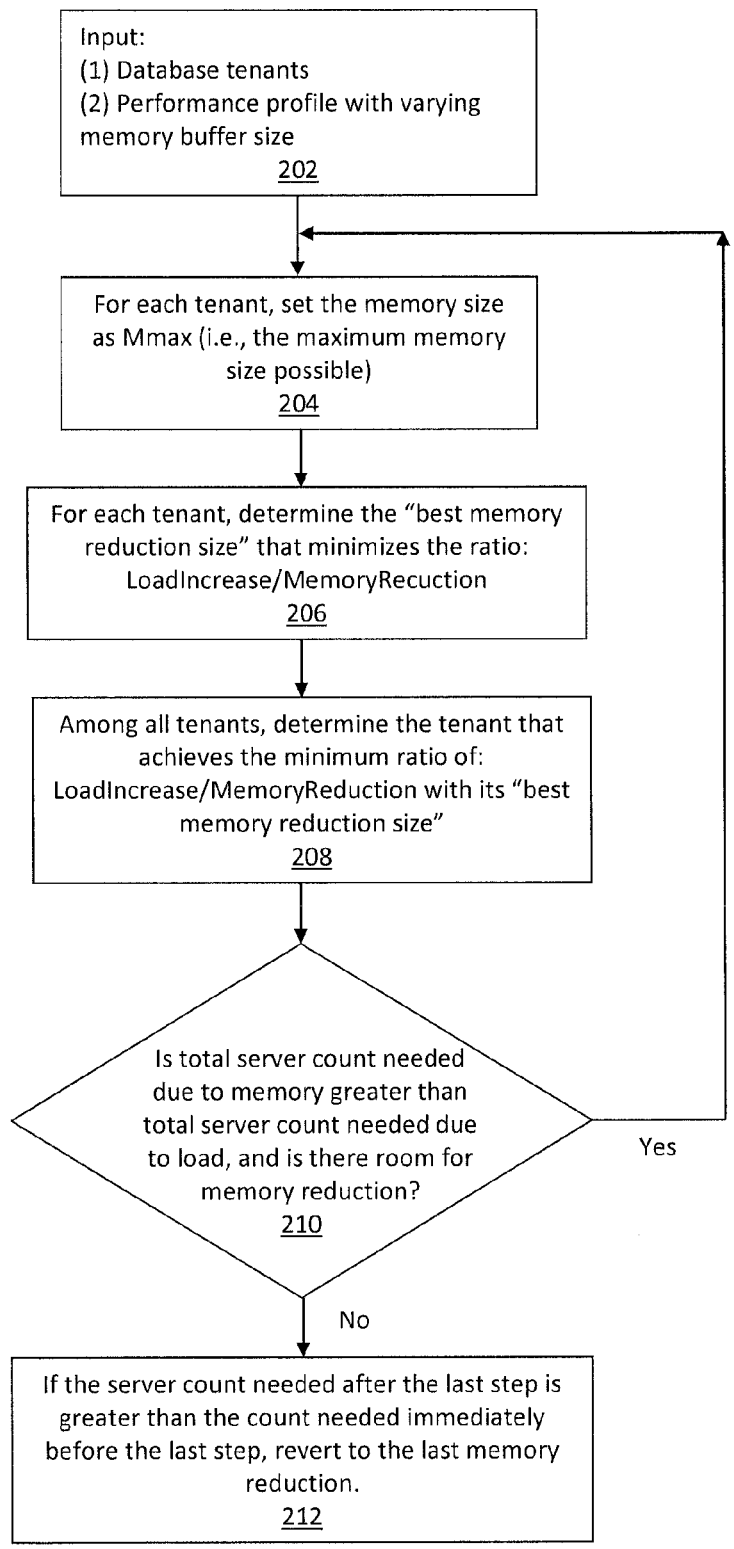
FIG. 2 is a block/flow diagram illustrating a method for determining server-count minimizing per-tenant memory size in accordance with the present principles.

In one embodiment according to the present principles, performance of individual tenants under varying memory buffer size and different degrees of buffer warmness is profiled in block 104, and is discussed in further detail in FIG. 2. For example, in a given query, cache warmness indicates what percentage of the buffer contains cached pages used by this query. In one embodiment according to the present principles, a tenant running in a private database instance always finds its cache 100% warm. Meanwhile, a tenant finds its cache 0% warm if it shares a buffer with another tenant that has at least the same query arrival rate, and has a working set size at least as large as the buffer size. In other words, if the working set size of one tenant is 25% of the buffer size, then the other tenant's cache is 75% warm, etc. In one embodiment according to the present principles, a profiler computes the profiles, and the profiler then measures the average query execution time of a given tenant under different buffer sizes and different warmness levels in block 104. In one embodiment according to the present principles, the input of the profiler is a set of sample queries (i.e., Q(t)), extracted from the workload of the tenant t, and the range of buffer sizes and warmness levels under which the tenant t is profiled. The output of the profiler is a profile of the tenant t, which varies depending on the input. While the above buffer sizes and warmness levels are illustratively provided, it is contemplated that other buffer sizes and warmness levels may also be employed according to the present principles.

In one embodiment according to the present principles, to measure the average query execution time under different buffer sizes, the profiler restarts the database daemon multiple times, corresponding to each time the database is assigned a different buffer size. To measure the average execution time under a certain warmness level (e.g., w % warmness), the profiler scans a dummy table whose size equals (100-w) % of the buffer size before executing each query in Q(t). This ensures that whenever a query q∈Q(t) is executed, no more than w % of the pages cached in the buffer are relevant to q, but at the same time the entire buffer is available as a workspace for q.

In one embodiment according to the present principles, the average execution time at any level of cache warmness drops almost monotonically as the buffer size increases, and higher levels of cache warmness drop faster. This behavior may be observed in various TPC-H queries, but it is noted that some TPC-H queries perform differently because of the way table scans are handled by, for example, InnoDB. In one embodiment, when scanning a table with, for example, MySql 5.5, when most of the table is cached except for a few pages, MySql reads the remaining pages one by one using individual random reads, which results in an execution time greater than when scanning the entire table from disk using a single sequential read. Some of the methods presented below according to the present principles assume that the profiles of tenants are monotonically non-increasing. Because the profiles of tenants occasionally deviate from this monotonicity, in one embodiment, the present system/method fixes the profile of each tenant by setting the average query execution time at any given buffer size to be no less than the average query execution times at larger buffer sizes for the same tenant in one embodiment according to the present principles. Thus, the profiles are forced to be monotonically non-increasing at the cost of conservatively overestimating the average query execution time for some buffer sizes.

In one embodiment according to the present principles, a two-dimensional vector packing problem (2-DVPP) is solved with a heuristic which assigns each tenant to a server in block 110. In one embodiment, a set of tenants is given (e.g., $t_1, \ldots t_n$). Each tenant $t_i$ is associated with an SLA throughput $r_i$ that is desired to be satisfied. The buffer size that we assign to the DBMS instance of tenant $t_i$ is $m_i$, the average execution time, $e_i$, of tenant $t_i$ is a function in $m_i$ that is a defined by the workload of $t_i$. Concurrency is restricted on disks so that no two tenants run queries on the same disk at a time. Therefore, in one embodiment according to the present principles, the average query execution time of each tenant depends only on the workload and the buffer size of that tenant. The load $l_i$ imposed by the tenant $t_i$ on its server equals $r_i \cdot e_i(m_i)$, where $r_i$ is the throughput SLA of tenant $t_i$. In one embodiment, we assume that $e_i$, and consequently $l_i$, are monotonically non-increasing functions in $m_i$. The total load of all tenants on a single server must not exceed the number of disks, and the total memory assigned to all tenants on a single server must not exceed the server memory size. For example, let D be the number of disks, and M be the memory size of each server. IN one embodiment, it is assumed that all servers have exactly the same resources. Therefore, without loss of generality, the unit of memory measurement is set to M, so that the memory size of each server equals 1, and $m_i \leq 1$ for all $t_i$. The average execution time function of each tenant may be scaled down by a factor of 1/D, so that the total load handled by each server equals 1, and $l_i \leq 1$ for all $t_i$.

In one embodiment according to the present principles, the minimum number of servers needed to host tenants depends on how much memory is assigned to each tenant (which in turn determines the load of each tenant), and how the tenants are packed into servers. For example, as illustrated in block 110, the problem of packing tenants may be formulated as a 2-DVPP where each tenant $t_i$ is represented by a 2-dimensional vector whose first dimension is the buffer size $m_i$, and whose second dimension is the load $l_i$. In one embodiment according to the present principles, each server has two capacities: a memory capacity of 1, and a load capacity of 1. As discussed above, $e_i$ and $l_i$ may depend on the workload and the throughput SLA of the tenant $t_i$, thus $m_i$ may be the only input of 2-DVPP that is tuned. In one embodiment, the minimum number of servers needed is found by determining a memory assignment function m*, which assigns a buffer size to each tenant such that the optimum output of the tenant placement 2-DVPP is minimized. In one embodiment, assuming that Opt_2DV P(m) is an algorithm that computes the optimum packing of tenants into servers, where the buffer sizes of tenants are determined by the memory assignment function m, then $$m^* = \underset{m}{\operatorname{argmin}}\{\operatorname{Opt\_2DV} P(m)\}$$

Referring now to FIG. 2, a method for determining server-count minimizing per-tenant memory size is illustratively shown. In one embodiment according to the present principles, database tenants and a performance profile with varying memory buffer size are input in block 202. In one embodiment, a method named Greedy Memory Reduction (GMR) may be employed to approximate $\hat{m}$ with an absolute error of no more than 1. Thus, one embodiment of a method (i.e., algorithm) according to the present principles finds a memory assignment $\hat{m}$ such that Lwr_2DV P($\hat{m}$)≤Lwr_2DV P($\hat{m}$)+1. In one embodiment according to the present principles, the memory size is initially set to the maximum memory size possible in block 204. Beginning by assigning a maximum buffer size to all tenants, the buffer sizes of some tenants are reduced (thereby trading memory for IO bandwidth) in a greedy fashion to determine the best memory reduction size in block 206, until the number of servers employed to provide the total memory size of all tenants and that employed to handle the total load of all tenants reaches a balanced state, and a minimum ratio of load increase/memory reduction is determined in block 208.

In one embodiment according to the present principles, the solution consists of two phases. First, each tenant is profiled under different buffer sizes, and then these profiles are employed to approximate $\hat{m}$. The notation employed is defined as follows. Let $\mu$ denote the minimum unit of memory allocation. Thus, server memory size M and all buffer sizes of all tenants are multiples of $\mu$. A reasonable, illustrative, order of magnitude for $\mu$ is 100 MB. Let $m_i^{min}$ denote the smallest buffer size for which the load of the tenant $t_i$ can be handled by a single server. That is, $m_i^{min}=\min\{m:l_i(m)\leq 1, m/\mu\in \mathbb{Z}\}$. Also, let $m_i^{max}$ denote the data size of $t_i$ if the data size of $t_i$ fits in the memory of a single server, or M otherwise. That is, $m_i^{max}=\min\{M, \min\{m:m\geq m_i^{ds}, m/\mu\in \mathbb{Z}\}\}$, where $m_i^{ds}$ is the data size of $t_i$. In the first phase, each tenant $t_i$ is profiled by measuring its average query execution time $e_i(m)$, for every m ranging from $m_i^{min}$ to $m_i^{max}$ with $\mu$ step size. Since $m_i^{min}$ is not known until $e_i(m_i^{min})$ is computed, the profiling begins from $m_i^{max}$ and m is decremented until either m=0, or $r_i \cdot e_i(m)>1$. In the second phase, the Greedy Memory Reduction (GMR) algorithm is employed to approximate $\hat{m}$ in pseudo-polynomial running time, with an absolute error of no more than 1, based on the profiles that were initially measured.

The GMR method (i.e., algorithm) according to one embodiment of the present principles may be illustrated as follows:

1: input $\left\{l_i(m): \forall t_i, \forall m, m_i^{min} \leq m \leq m_i^{max}, \dfrac{m}{\mu} \in \mathbb{Z}\right\}$ 2: Set k ← 0

3: Set $m_i(k) \leftarrow m_i^{max}, \forall t_i$

4: while $\sum_i m_i(k) > \sum_i l_i(m_i(k))$ and ∃ i: $m_i(k) > m_i^{min}$ do

5:  Let $\bar{l}_i(k, \delta) = \dfrac{l_i(m_i(k) - \delta) - l_i(m_i(k))}{\delta}$ 6:  Let $\delta_i(k) = \arg\underset{\delta}{\min}\left\{\bar{l}_i(k, \delta): m_i(k) - \delta \geq m_i^{min}, \dfrac{\delta}{\mu} \in \mathbb{Z}^+\right\}$, if tied pick the largest δ.

7:  Let $i(k) = \arg\underset{i}{\min}\{\bar{l}_i(k, \delta_i(k))\}$, break ties arbitrarily.

8:  Set $m_{i(k)}(k + 1) \leftarrow m_{i(k)}(k) - \delta_{i(k)}(k)$

9:  Set $m_i(k + 1) \leftarrow m_i(k), \forall i \neq i(k)$

10: Set k ← k + 1

11: end while

12: if $\max\{\Sigma_i m_i(k), \Sigma_i l_i(m_i(k))\} > \max\{\Sigma_i m_i(k - 1), \Sigma_i l_i(m_i(k - 1))\}$ then 13:  Set $m_{i(k)}(k) \leftarrow m_{i(k)}(k - 1)$ 14: end if 15: Set $m(t_i) = m_i(k), \forall i$ 16: return $\hat{m}$ In one embodiment according to the present principles, when employing the GMR, each tenant $t_i$ is assigned a buffer size of $m_i^{max}$. Because the initial total memory is maximum, and since the load is a monotonically non-increasing function in the buffer size, then the initial total load is minimum. After the initialization phase, the method proceeds in iterations such that each iteration decreases the buffer size of a single tenant in block 206. Specifically, in one embodiment, in each iteration k, a tenant $t_{i(k)}$ is selected whose current buffer size $m_{i(k)}(k)$ can be decreased by some amount of memory δ while incurring a minimum average load increase per unit memory decreased (i.e., the cheapest available block of memory to remove from a single tenant). In one embodiment according to the present principles, the above-mentioned loop is terminated either when the total memory needed by all tenants becomes no more than the total load in block 210, or when each tenant $t_i$ is assigned its minimum feasible buffer size $m_i^{min}$. If the server count needed after the step in block 210 is greater than the count needed immediately before the last step, the method reverts to the last memory reduction in block 212. After the loop, a check is run to determine whether to roll back the last iteration of the loop, and the memory assignment returned by GMR is denoted as $\hat{m}$.

In one embodiment according to the present principles, the running time of GMR is analyzed by first assuming that a priority queue is employed to select i(k) at each iteration. The running time of GMR is affected by the value of $$\frac{M}{\mu}$$

(i.e., the granularity at which memory is assigned to tenants). If $$\frac{M}{\mu}$$

is a constant, then the absolute approximation error equals 1, and the running time is O(n log(n)), where n is the number of tenants. However, in one embodiment, $\mu$ may be used as a parameter to control the running time as well as the approximation error of GMR. If $\mu$ is a parameter, the running time of GMR may be represented as $$\left(n\frac{M}{\mu}\left(lg(n) + \frac{M}{\mu}\right)\right),$$

and the worst case absolute error equals $$1 + n\frac{\mu}{M}.$$

The extra error results because each tenant may be assigned μ–ϵ memory units more than its optimum memory assignment, where ϵ represents a negligible amount of memory. In one embodiment according to the present principles, the following theorem states the approximation guarantee of GMR when $$\frac{M}{\mu}$$

is constant:

Lwr_2DVP($\dot{m}$)≤Lwr_2DVP($\hat{m}$)+1.     Theorem 1:

In one embodiment, by employing the equation Opt_2DV P(m)≤3·Lwr_2DV P(m) and Theorem 1, the result is:

$$Opt\_2DV\ P(\dot{m}) \leq 3 \cdot Lwr\_2DV\ P(\dot{m}) \leq 3 \cdot Lwr\_2DV\ P(\hat{m}) + 3 \leq$$
$$3 \cdot Lwr\_2DV\ P(m^*) + 3 \leq 3 \cdot Opt\_2DV\ P(m^*) + 3$$

Next, by defining (m)={(m($t_i$), $l_i$(m($t_i$))):∀$t_i$} for any m, the set V($\dot{m}$) may be passed as input to 2-DVPP to get a tenant placement plan that assigns tenants to servers based at least in part on the best memory reduction size determined in block 206. While the GMR method is advantageously employed according to the present principles, it is contemplated that other methods (i.e., algorithms) may also be used. In one embodiment according to the present principles, another method to obtain a memory assignment function that minimizes the total number of servers is employed. This method is named the Balanced Memory Reduction (BMR) method. In one embodiment, for each tenant, the memory allocated to said tenant is iteratively reduced until, for this particular tenant, the buffer size and the load reach a balanced state. For any memory assignment m, let:

$$\mathcal{D}(m) = \max_{t_i}\{\max\{m(t_i), l_i(m(t_i))\}\}$$

That is, $\mathcal{D}$(m) represents the maximum dimension of all vectors in V(m). If V(m) is employed as input to Integer Linear Program (ILP)-1 and Linear Program (LP)-1 (both discussed in further detail below), the worst case ratio between the solution value of ILP-1 and the solution value of LP-1 is 1+2 $\mathcal{D}$(m). Since the maximum value of $\mathcal{D}$(m) is 1, the worst case ratio between the solution values of ILP-1 and LP-1 is no more than 3. Inequality is based on the maximum of $\mathcal{D}$(m), but a more general inequality that takes $\mathcal{D}$(m) into account may be stated as follows:

Opt_2DVP(m)≤(1+2 $\mathcal{D}$(m))·Lwr_2DVP(m).

The GMR method discussed above focuses on minimizing Lwr_2DVP(m). BMR is another approach which obtains a tight bound on Opt_2DVP(m), and minimizes $\mathcal{D}$(m). In one embodiment according to the present principles, the profiling phase discussed above is employed to compute the function $l_i$ for each tenant $t_i$. Next, each tenant $t_i$ is assigned, independently of other tenants, a buffer size $m_i$ that minimizes max{$m_i$, $l_i(m_i)$}. This memory assignment function is referred to as $\dot{m}$. In one embodiment, if load is a non-monotonic function in buffer size, $\dot{m}(t_i)$ is computed by trying every buffer size for which $t_i$ is profiled from $m_i^{min}$ to $m_i^{max}$. However, assuming that load is a monotonically non-increasing function in buffer size, $\dot{m}$ may be computed by employing the BMR method (shown in further detail below). In one embodiment, for each tenant $t_i$, $\dot{m}(t_i)$ is initialized to $m_i^{max}$, and then $\dot{m}(t_i)$ is iteratively decreased until $\dot{m}(t_i)<l_i(\dot{m}(t_i))$. Next, it is determined whether rolling back the last iteration minimizes max{$m_i$, $l_i(m_i)$}. If yes, the last iteration is rolled back, and this method is referred to as BMR. The BMR method (i.e., algorithm) according to one embodiment of the present principles may be illustrated as follows:

---

1:    input $\left\{l_i(m): \forall\ t_i, \forall\ m, m_i^{min} \leq m \leq m_i^{max}, \dfrac{m}{\mu} \in \mathbb{Z}\right\}$ 2:    for all $t_i$ do
3:       Set $\dot{m}(t_i) \leftarrow m_i^{max}$
4:       while $\dot{m}(t_i) > l_i(\dot{m}(t_i))$ do
5:          Set $\dot{m}(t_i) \leftarrow \dot{m}(t_i) - \mu$
6:       end while
7:       if max {$\dot{m}(t_i)$, $l_i(\dot{m}(t_i))$} > max {$\dot{m}(t_i) - \mu$, $l_i(\dot{m}(t_i) - \mu)$} then
8:          Set $\dot{m}(t_i) \leftarrow \dot{m}(t_i) - \mu$
9:       end if
10:   end for
11:   return $\dot{m}$

---

BMR, unlike GMR, lacks an approximation guarantee, and therefore, it is possible to encounter corner cases where BMR does not perform optimally according to the present principles. For example, in a case where there are n tenants where all tenants have the profile {$l_i$(1−ϵ)=0, $l_i$, (0)=1}. In one embodiment, BMR sets the buffer size of each tenant to 1−ϵ, which minimizes $\mathcal{D}$($\dot{m}$). However, this memory configuration employs n servers to host the n tenants, which is the maximum number of servers any memory configuration method (i.e., algorithm) may employ. In one embodiment according to the present principles, when the same input is given to GMR, GMR sets the buffer sizes of half the tenants to 1−ϵ, and the buffer sizes of the other half to 0, thus employing [n/2] servers to host the given tenants. Notwithstanding the above-mentioned non-optimal situation with BMR, BMR also contains several practical advantages over GMR. First, BMR is more efficient in terms of running time. If μ is not a parameter, the running time of BMR may be linear. Otherwise, in one embodiment according to the present principles, if μ is a parameter, the running time of BMR is $$O\!\left(n\frac{M}{\mu}\right),$$

where n is the number of tenants. Secondly, BMR assigns a buffer size to each tenant independently of other tenants, thus it may be employed as an online algorithm. Third, BMR performs as least as well as GMR in practice, and in some cases, BMR generates tenant placement plans that employ fewer servers than GMR to achieve the same result. Fourth, BMR is very simple, and easy to implement, as compared to GMR. While the BMR method is advantageously employed according to the present principles, it is contemplated that other methods (i.e., algorithms) may also be used.

In one embodiment according to the present principles, a hybrid approach that attempts to balance the buffer size and the load of each tenant, while taking advantage of the theoretical approximation guarantee of GMR, is employed. This approach is referred to as GMR+BMR. In one embodiment of GMR+BMR, the method begins by running GMR until its end to obtain $\dot{m}$, and then iteratively reducing $\mathcal{D}$($\dot{m}$) as long as this reduction does not degrade the theoretical approximation guarantee of $\dot{m}$. In each iteration k, $\mathcal{D}$($\dot{m}$) is reduced by $\mu$ by going through each tenant $t_i$ and ensuring that $\max\{m_k(t_i), l_i(m_k(t_i))\} \le \mathfrak{D}(\dot{m}_{k-1}-\mu$. If this inequality does not hold, according to one embodiment, we either decrease $\dot{m}(t_i)$ by $\mu$ if $\dot{m}_{k-1}(t_i) > l_i(\dot{m}_{k-1}(t_i))$. Otherwise, if $\dot{m}_{k-1}(t_i) \le l_i(\dot{m}_{k-1}(t_i))$, we increase $\dot{m}(t_i)$ until $l_i(\dot{m}(t_i))$ is decreased by $\mu$. We terminate once it is no longer possible to reduce $\mathfrak{D}(\dot{m})$ by $\mu$, or if decreasing $\mathfrak{D}(\dot{m})$ by $\mu$ violates the inequality:

$$(1+2\,\mathfrak{D}(\dot{m}_k))\mathrm{Lwr\_2DVP}(\dot{m}_k) \le (1+2\,\mathfrak{D}(\dot{m}))\mathrm{Lwr\_2DVP}(\dot{m}).$$

In one embodiment according to the present principles, GMR+BMR improves the approximation guarantee of GMR significantly, but does not significantly decrease the actual number of servers needed by GMR, since the actual number of servers needed by GMR is usually much less than the upper bound imposed by the approximation guarantee of GMR. While the GMR-BMR method is advantageously employed according to the present principles, it is contemplated that other methods (i.e., algorithms) may also be used.

Figure 3:
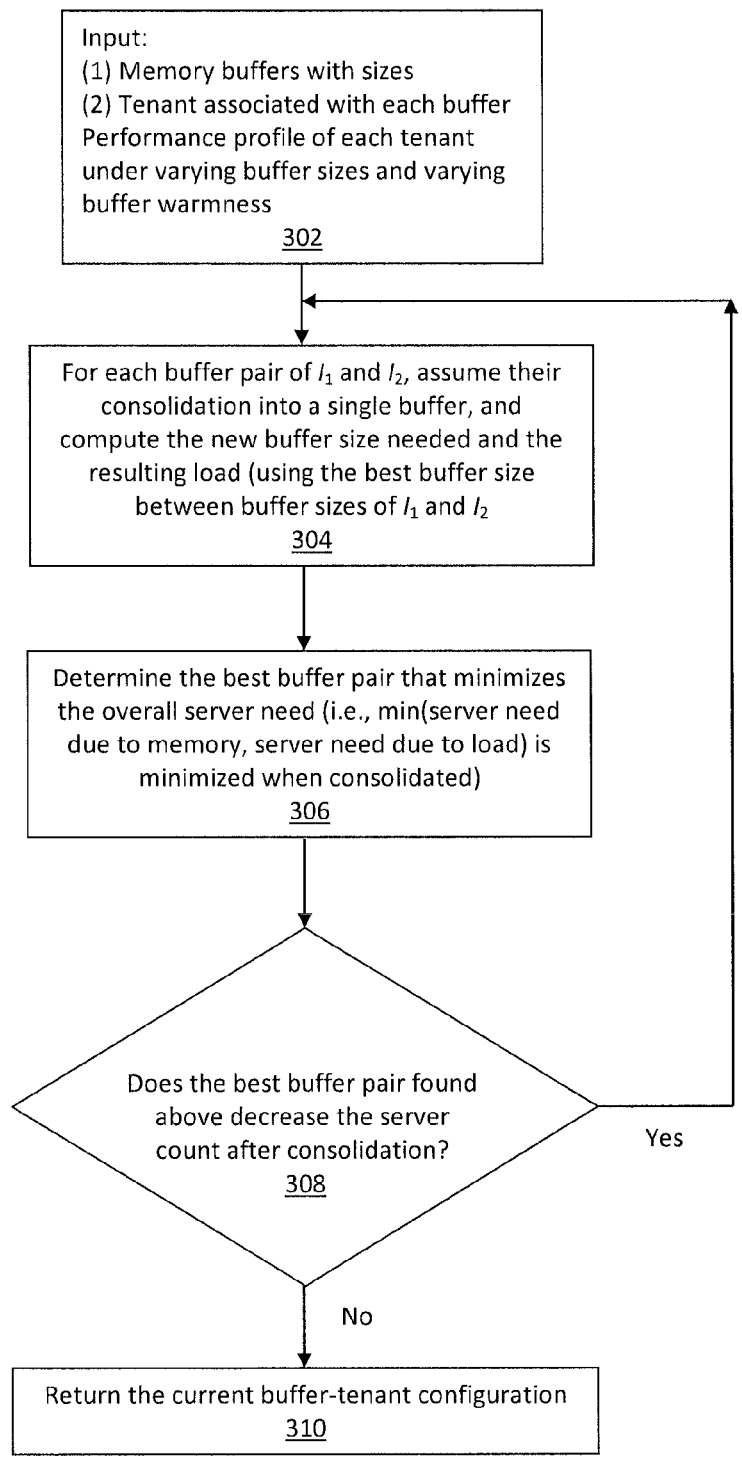
FIG. 3 is a block/flow diagram illustrating a method for determining optimal buffer sharing/server consolidation among tenants in accordance with the present principles.

Referring now to FIG. 3, a block/flow diagram illustrating a method for determining optimal buffer sharing/server consolidation among tenants in accordance with the present principles is shown. Memory buffers with sizes and tenants associated with each buffer performance profile of each tenant under varying buffer sizes and varying buffer warmness are input in block 302. In one embodiment according to the present principles, for each buffer pair, it is assumed that each pair is consolidated into a single buffer, and the new buffer size and the resulting load are computed in block 304. The best buffer pair that minimizes the overall server need is determined in block 306. In one embodiment according to the present principles, a second level of multitenancy is allowed. This second level of multitenancy employs multiple tenants sharing the same DB instance. In one embodiment, a memory assignment is determined for tenants in private database instances. Next database instances are iteratively consolidated, one pair at a time, as long as the number of servers employed to host tenants after iterative consolidation is no more than the number of servers before the consolidation. In one embodiment, if the best buffer pair decreases the server count after consolidation in block 308, then repeat the steps in blocks 304 and 306. If not, then return the current buffer-tenant configuration in block 310.

In one embodiment according to the present principles, to ensure that the number of servers does not increase when performing iterative consolidation, two invariants are maintained. These invariants are (1) that the total memory does not increase, and (2) that the total load does not increase. In one embodiment, the load of a tenant $t$ in a shared database instance is computed as follows. Let $\mathfrak{I}(t)$ be the database instance that hosts $t$. A conservative assumption is made which assumes that any other tenant $t_l$ hosted by the same database instance $\mathfrak{I}(t)$ uses $m_l^{max}$ memory units as cache for each query it executes; that is, $t_l$ uses all its data set to answer each query. Let $m(\mathfrak{I}(t))$ be the buffer size of $\mathfrak{I}(t)$. If $\Sigma_l m_l^{max} > m(\mathfrak{I}(t))$, then $t$ is 0% warm. Otherwise, the warmness level of $t$ is defined by $m(\mathfrak{I}(t)) - \Sigma_l m_l^{max}$ rounded down to the closest warmness level at which $t$ is profiled. For example, if $m(\mathfrak{I}(t)) - \Sigma_l m_l^{max} = 0.74 m(\mathfrak{I}(t))$, and the set of warmness levels at which $t$ is profiled is $\{0, 25, 50, 75, 100\}$, then $t$ is considered 50% warm. Having decided the warmness level of $t$, the load of $t$ is computed as a function in the buffer size and the warmness level.

In one embodiment according to the present principles, a heuristic approach to database consolidation is employed, and this approach is named the Greedy Tenant Consolidation (GTC) method (i.e., algorithm). The input to the heuristic is a set of tenant profiles that provide the load of each tenant as a function in buffer size and warmness level. In one embodiment, the output is an instance assignment function $\mathfrak{I}$ that assigns each tenant to a database instance, and a memory assignment function $m$ that assigns a buffer size to each database instance. The cost function that is minized is $\max\{\Sigma_i l(t_i), \Sigma_j m(I_j)\}$. Rather than searching for a global minimum for the cost function, the above-mentioned heuristic operates greedily by picking at each iteration a pair of database instances whose consolidation reduces the cost function as much as possible. The GTC method may be illustratively represented as follows:

```
 1: procedure Best Configuration (I₁,I₂)
 2:     Let mᵐⁱⁿ = min{m(I₁),m(I₂)}
 3:     Let mᵐᵃˣ = max{m(I₁),m(I₂)}
 4:     Set I_new ← I₁ ∪ I₂
 5:     Set best_min_gain ← 0, best_total_gain ← 0
 6:     Set best_buffer_size ← ∞
 7:     for all m ∈ [mᵐⁱⁿ,mᵐᵃˣ] where μ|m do
 8:         Set m(I_new) ← m
 9:         Let m_gain = m(I₁) + m(I₂) − m(I_new)
10:         Let l_gain = l(I₁) + l(I₂) − l(I_new)
11:         if l(I_new) > 1 or l_gain < 0 then continue
12:         Set min_gain = min{m_gain,l_gain}
13:         Set total_gain = m_gain + l_gain
14:         if min_gain < best_min_gain or (min_gain = best_min_gain
    and total_gain < best_total_gain) then
15:             Set best_min_gain ← min_gain
16:             Set best_total_gain ← total_gain
17:             Set best_buffer_size ← m
18:         end if
19:     end for
20:     Set m(I_new) ← best_buffer_size
21:     return (I_new)
22: end procedure
23: procedure Greedy Consolidation (ℑ)
24:     Set num_servers ← min{Σ_{I_i∈ℑ}m(I_i),Σ_{I_i∈ℑ}l(I_i)}
25:     Set new_num_servers ← num_servers
26:     loop
27:         Set consolidation_pair ← (null, null)
28:         Set I_new ← null
29:         for all I_i,I_j ∈ ℑ where i ≠ j do
30:             Set I ← Best Configuraion (I_i,I_j)
31:             if max{m(I),l(I)} < num_servers then
32:                 Set new_num_server ← max{m(I), l(I)}
33:                 Set consolidation_pair ← (I_i, I_j)
34:                 Set new_instance ← I
35:             end if
36:         end for
37:         if consolidation_pair ≠ (null,null) then
38:             Let consolidation_pair = (I₁,I₂)
39:             Remove I₁ and I₂ from ℑ
40:             Add I_new to ℑ
41:         else
42:             break
43:         end if
44:     end loop
45:     return ℑ
46: end procedure
```

In one embodiment according to the present principles, to compute the amount of reduction in the cost function that may be achieved by consolidating two database instances (e.g., $I_1$ and $I_2$ where $m(I_2) \ge m(I_1)$), a buffer size is first chosen for the potential consolidated instance (e.g., $I_{new}$), in the range from $m(I_2)$ through $m(I_1)+m(I_2)$. These upper and lower bounds ensure that invariants (1) and (2), as discussed above, are true, respectively. The upper bound is obvious, and to justify the lower bound, two notes are made. First, note that the load is a monotonically non-increasing function in buffer size and warmness level. Because the method begins from the output of private instance configuration, decreasing the buffer size of any tenant increases the load because private instance configuration terminates only after taking advantage of any chance of decreasing the buffer size of a tenant while maintaining the load of that tenant intact. Secondly, note that consolidation either decreases warmness (which increases load), or keeps warmness and load intact (if warmness is already 0%). In one embodiment according to the present principles, based on these two notes, if a buffer size for $I_{new}$ less than $m(I_2)$ is chosen, the buffer sizes of all tenants in $I_{new}$ decreases, and their warmness levels either decrease or remain the same. Thus, the total load increases, and invariant (2) may be violated.

In one embodiment according to the present principles, within the range $[m(I_2), m(I_1)+m(I_2)]$, we choose a buffer size that minimizes the cost function $\max\{\Sigma_i l(t_i), \Sigma_j m(I_j)\}$. If more than one buffer size minimizes the cost function, we choose the one that also minimizes $\min\{\Sigma E_i l(t_i), \Sigma_j m(I_j)\}$. After we choose a buffer size for the potential instance of $I_{new}$, which corresponds to the pair of instances $I_1$ and $I_2$, we compare this pair of instances against other candidate pairs of instances, and choose the pair whose consolidation achieves as much reduction of the cost function $\max\{\Sigma_i l(t_i), \Sigma_j m(I_j)\}$ as possible. In one embodiment, the method is terminated once no consolidation decreases the cost function. While the GTC method is advantageously employed according to the present principles, it is contemplated that other methods (i.e., algorithms) may also be used.

Figure 4:
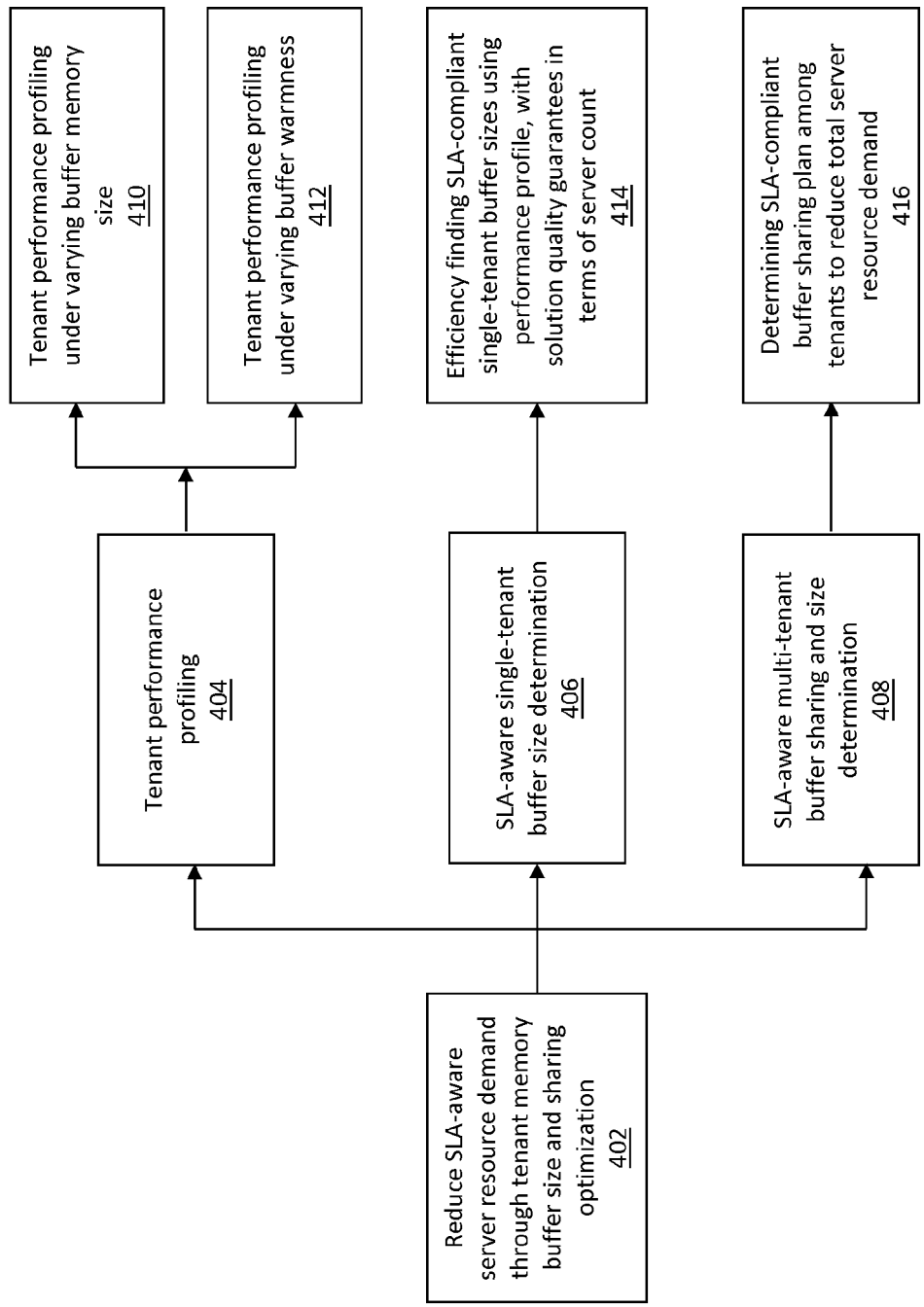
FIG. 4 is a block/flow diagram illustrating a system/method for reducing Service Level Agreement (SLA)-aware server resource demand through tenant memory buffer size and sharing optimization in accordance with the present principles.

Referring now to FIG. 4, a system/method for reducing Service Level Agreement (SLA)-aware server resource demand through tenant memory buffer size and sharing optimization is illustratively shown in accordance with the present principles. In one embodiment according to the present principles, SLA-aware server resource demand through tenant memory buffer size and sharing optimization is reduced in block 402. Tenant performance profiling is performed for each tenant in block 404. In one embodiment, SLA aware single tenant buffer size determination is performed in block 406, and SLA-compliant single tenant buffer sizes are efficiently found by employing a performance profile in block 414. In block 408, SLA-aware multi-tenant buffer sharing and size determination are performed, and an SLA-compliant buffer sharing plan among tenants is determined to reduce total server resource demand in block 416. For each tenant, the memory allocated is iteratively reduced until the buffer size and the load reach a balanced state. In one embodiment, tenant performance profiling is performed under varying buffer memory sizes and under varying buffer warmness in blocks 410 and 412, respectively. In one embodiment, the steps of block 414 achieves server count reduction through optimization of private buffer sizes, and the steps in block 416 further reduces the server count through buffer sharing among multiple tenants and optimization of the shared buffer size.

In one embodiment, the effect of memory on query latency through workload profiling is captured, and a memory sizing decision for each tenant to minimize total resource capacity is made in accordance with the present principles. In this instance, each tenant may potentially receive a memory size smaller than the working set. In one embodiment, private buffer consolidation is employed to make memory sizing decisions. Private buffer consolidation does not allow any memory buffer sharing between two different tenants, and while memory contention is avoided, more memory resources are employed than with shared buffer consolidation. Shared buffer consolidation allows one or more tenants to share a buffer, and further reduces memory resource need. Both of these solutions meet the specified throughput SLA. The optimizations are performed while ensuring that the throughput SLAs of the tenants are observed. While reduction of SLA-aware server resource demand reduction and private and shared buffer consolidation are illustratively shown, it is contemplated that other sorts of SLA-aware server resource demand reduction and consolidation techniques may also be used in accordance with the present principles.

For example, in one embodiment according to the present principles, optimal tenant buffer size may be determined by employing 2-DVPP. 2-DVPP is a non-deterministic polynomial-time hard (NP-hard) problem in the strong sense (i.e., the worst case running time is exponential in the value of the input), and therefore, finding m* is NP-hard as well. In one embodiment, there are polynomial-time approximation methods for 2-DVPP employed with guarantees on the worst case ratio between the approximate solution value and the optimum solution value. Such ratios are called approximation ratios. In one embodiment, for approximation methods (i.e., algorithms) of NP-hard problems, worst case approximation ratios are guaranteed by proving a worst case ratio between the approximate solution value and a lower bound of the optimum solution value (rather than the optimum solution value itself). The lower bound that is used in this case is a solution value that may be computed efficiently for each instance of the hard problem, and is less than the optimum solution value.

For example, let Aprx_2DV P be an approximation method for 2-DVPP with a worst case approximation ratio of p, and let Lwr_2DV P be the lower bound that is employed to prove the approximation ratio of Aprx_2DV P. Thus, Aprx_2DV P(m)/Lwr_2DV P(m)≤p, for any m. Since Opt_2DV P(m)≤Aprx_2DV P, then Opt_2DV P(m)/Lwr_2DV P(m)≤p for any m. In one embodiment, let m̂ be a memory assignment that minimizes Lwr_2DV P( ). That is:

$$\hat{m} = \arg\min_{m}\{Lwr\_2DV\ P(m)\}$$

Thus, Aprx_2DV P(m)/Lwr_2DV P(m)≤p, for any m. Since Opt_2DV P(m)≤Aprx_2DV P, then Opt_2DV P(m)/Lwr_2DV P(m)≤p for any m. In one embodiment, let m̂ be a memory assignment that minimizes Lwr_2DV P( ) This may be represented as:

$$\hat{m} = \arg\min_{m}\{Lwr\_2DV\ P(m)\}$$

Thus, Lwr_2DV P(m̂)≤Lwr_2DV P(m*). Consequently, $$Opt\_2DV\ P(m^*) \le p \cdot Lwr\_2DV\ P(\hat{m}) \le$$
$$p \cdot Lwr\_2DV\ P(m^*) \le p \cdot Opt\_2DV\ P(m^*).$$

In one embodiment according to the present principles, a lower bound may be computed for tenant placement problem by employing tenants spanned across multiple servers. This may be determined by employing an integer linear program (ILP) for a tenant placement 2-DVPP as follows (for illustrative purposes, the following ILP formulation is referred to as ILP-1):

$$\min \sum_k z_k$$

$$\text{s.t.} \quad \forall i \quad \sum_j x_{ij} = 1$$

$$\forall i, k \quad x_{ik} \leq z_k$$

$$\forall k \quad \sum_i x_{ik} m_i \leq z_k$$

$$\forall k \quad \sum_i x_{ik} l_i \leq z_k$$

$$\forall i, k \quad x_{ik} \in \{0, 1\}$$

$$\forall k \quad z_k \in \{0, 1\}$$

In one embodiment, $x_{ik}=1$ if and only if tenant $t_i$ is hosted by server $s_k$, and $z_k=1$ if and only if server $s_k$ hosts at least one tenant. Because the number of servers employed to host all tenants is not greater than the number of tenants, $1 \leq i$ and $k \leq n$, where n is the number of tenants. Solving ILP-1 results in an optimum solution to the tenant placement 2-DVPP, but the solution is NP-hard. In one embodiment, relaxing ILP-1 by replacing the integer constraints (i.e., the last two constraints) with non-negativity constraints (i.e., $x_{ik}, z_k \geq 0$, $\forall i, k$) turns ILP-1 into a linear program (LP) that may be solved in polynomial time. The linear program that results from this relaxation is illustratively referred to as LP-1. In one embodiment, the solution value of LP-1 is a lower bound of the solution value of ILP-1, and the maximum ratio between the solution value of ILP-1 and the solution value of LP-1 is 3. In one embodiment according to the present principles, Opt_2DVP(m) is defined as the solution value of ILP-1, and Lwr_2DVP(m) as the solution value of LP-1, thus:

Opt_2DVP($m$) ≤ 3·Lwr_2DVP($m$)

By substituting in the equation:

Opt_2DV P($m^*$) ≤ $p$·Lwr_2DV P($\hat{m}$) ≤

$p$·Lwr_2DV P($m^*$) ≤ $p$·Opt_2DV P($m^*$)

the result is

Opt_2DVP($\hat{m}$) ≤ 3·Opt_2DVP($m^*$)

In one embodiment according to the present principles, a memory assignment $\hat{m}$ is determined that minimizes Lwr_2DV P( ), which helps enable the present system/method to deal with an extremely large number of tenants (e.g., tens of thousands). In one embodiment, the solution value of LP-1 equals max$\{\Sigma_i l_i, \Sigma_i m_i\}$. Therefore, $$\hat{m} = \arg \min\left\{\max\left\{\sum_i l_i(m(t_i)), \sum_i m(t_i)\right\}\right\}$$

In one embodiment, determining $\hat{m}$ provides an input to 2-DVPP such that when 2-DVPP is solved optimally, the resulting output number of servers is no more than three times the minimum number of servers required to host the tenants. While determining tenant buffer size by employing a 2-DVPP method is illustratively shown, it is contemplated that other sorts of methods may also be employed in accordance with the present principles.

Figure 5:
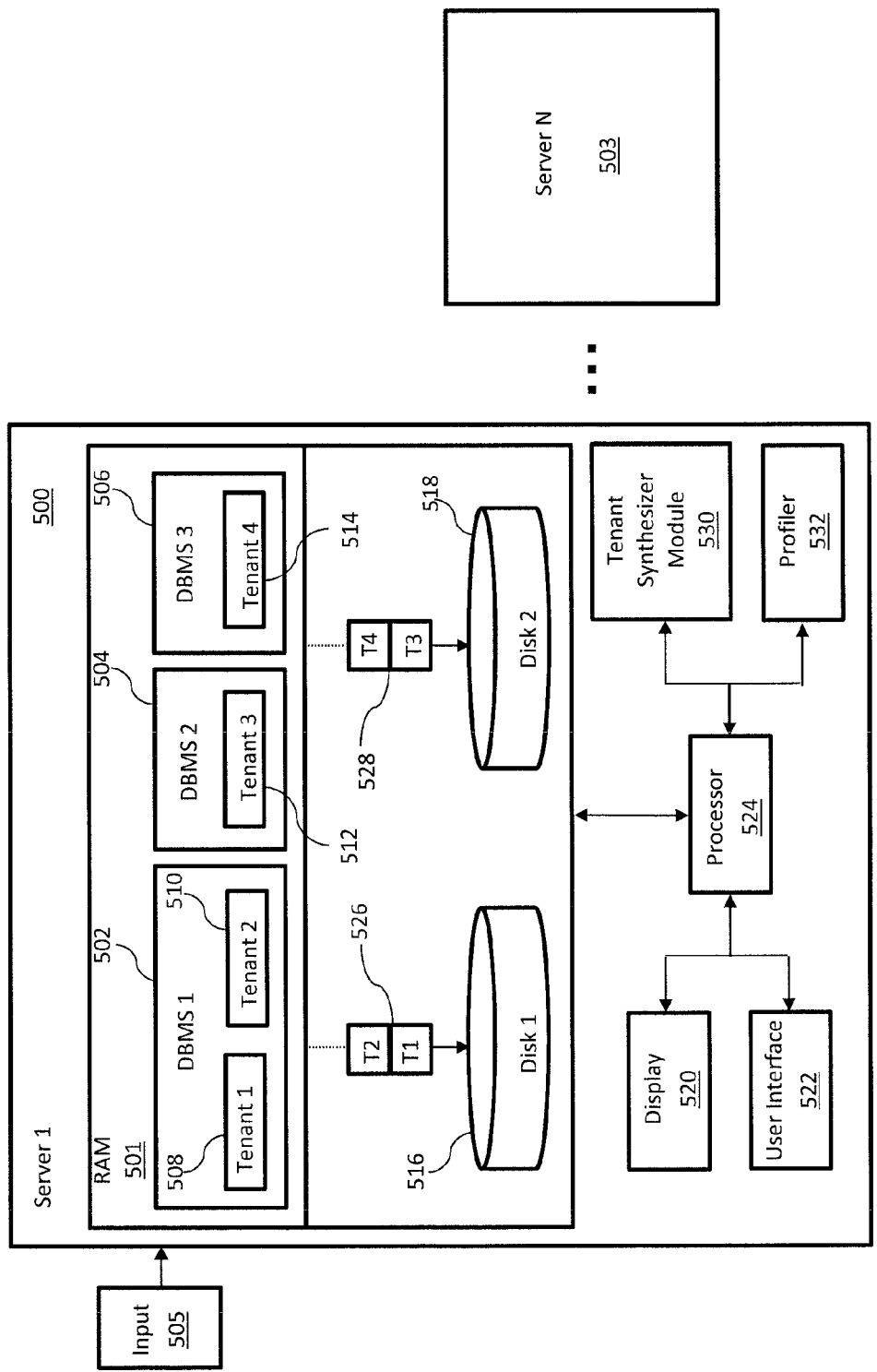
FIG. 5 is a block diagram illustrating a system for reducing Service Level Agreement (SLA)-aware server resource demand through tenant memory buffer size and sharing optimization in accordance with the present principles.

Referring now to FIG. 5, a system for reducing Service Level Agreement (SLA)-aware server resource demand through tenant memory buffer size and sharing optimization in accordance with the present principles is illustratively shown. In one embodiment according to the present principles, the system comprises one or more servers 500 and 503, RAM 501, a processor 524, a user interface 522, and a display 520. In one embodiment, the problem of tenant placement for IO-bound OLAP workloads is solved. The present system configures and places OLAP tenants in a manner that minimizes the total number of servers needed to host tenants, while satisfying the throughput SLA requirements of each tenant based in part on the data input 505. In one embodiment, the system 500 comprises multitenancy architecture, where each server hosts one or more DBMS instances 502, 504, 506, and each DBMS instance 502, 504, 506 hosts one or more tenants 508, 510, 512, and 514. The database server allocates and controls one buffer pool 526 and 528 per database instance, which enables a high degree of cost efficiency without performance loss. The system determines which DBMS instances 502, 504, 506 should be hosted together on the same server 500 and 503, how much memory 501, 516, 518 should be assigned to each database instance 502, 504, 506, and which tenants 508, 510, 512, 514 should be placed together within the same DBMS instance 502, 504, 506.

In one embodiment according to the present principles, multiple DBMS instances 502, 504, 506 share the same server 500. While a single DBMS instance per server (not shown) allows a larger buffer pool shared among hosted tenants, one tenant may greedily evict the cached pages of other tenants that share the same buffer pool, which may result in uncontrollable and inferior performance. Thus, multiple DBMS instances 502, 504, 506 may be employed on the same server 500 to impose controlled boundaries between the buffer pools 526 and 528 of different (groups of) tenants.

In another embodiment according to the present principles, multiple databases (tenants) 508 and 510 share the same DBMS instance 502. In one embodiment, some tenants 508 and 510 are consolidated into the same DBMS instance 502 whenever their throughput SLAs allow for such consolidation. Some tenants employ non-trivial buffer sizes to satisfy their throughput SLAs, but their buffers 526 and 528 do not have to remain warm from one query to another. In other words, the buffer pool 526 and 528 is merely used as a working space (e.g., in a nested loop join, a table is scanned multiple times during the running time of a single query).

In one embodiment of the multitenant environment system, each tenant 508, 510, 512, and 514 introduces a certain load to its hosting server 500. The term 'load' indicates the fraction of time that the hosting server 500 spends on serving queries from the given tenant 508, 510, 512, and 514 on average. In one embodiment, the load of a tenant 508, 510, 512, and 514 depends on two factors: (1) the average query arrival rate of the tenant 508, 510, 512, and 514, which is bounded by the throughput SLA of the tenant, and (2) the average query execution time of the tenant 508, 510, 512, and 514. In one embodiment, the average query execution time of a tenant is affected by three main factors: (1) the workloads of other tenants running concurrently on the same DBMS instance, (2) the workloads of other tenants running on other DBMS instances but utilizing the same disk, and (3) the buffer pool size assigned to the tenant. While a multitenancy architecture where each server advantageously hosts one or more DBMS instances and each DBMS instance advantageously hosts one or more tenants is illustratively shown, it is contemplated that other architectures and/or hosting combinations may also be employed according to the present principles.

In one embodiment according to the present principles, given a set of tenants 508, 510, 512, and 514, a profiler 532 is employed to profile each tenant 508, 510, 512, and 514, and the profiles of the tenants that are generated are employed as input 505 to the system to determine a placement plan that minimizes the total number of servers needed to host all tenants 508, 510, 512, and 514 while satisfying each per-tenant throughput SLA. In one embodiment, the placement plan assigns each tenant 508, 510, 512, and 514 to a DMBS instance 502, 504, 506 (either a private DBMS instance 504, 506 or a DBMS instance 502 shared with other tenants), assigns each DBMS instance 502, 504, 506 to a server 500, 503, and determines the buffer size of each DBMS instance 502, 504, 506. In one embodiment, the optimum solution (i.e., minimum number of servers) may be found by solving the following mixed-integer non-linear program (MINLP), which is referred to as MINLP-1:

$$\min \sum_k z_k$$

$$\text{s.t.} \quad \forall\, i \quad \sum_j x_{ij} = 1$$

$$\forall\, j \quad \sum_k y_{jk} = 1$$

$$\forall\, j, k \quad y_{jk} \le z_k$$

$$\forall\, k \quad \sum_j y_{jk} m_j \le z_k$$

$$\forall\, k \quad \sum_j y_{jk} \sum_i x_{ij} r_i e_i\!\left(m_j, \sum_l x_{lj}\right) \le z_k$$

$$\forall\, i, j, k \quad x_{iy}, y_{jk}, z_k \in \{0, 1\}$$

$$\forall\, j \quad 0 \le m_j \le 1$$

In one embodiment according to the present principles, decision variables are explained as follows. $x_{ij}=1$ if and only if the tenant I is hosted by the DBMS instance j, $y_{jk}=1$ if and only if the DBMS instance j is hosted by the server ki, and $z_k=1$ if and only if the server k is employed (i.e., hosts at least one database instance). $m_j$ is the buffer size of the DBMS instance j, measured as a fraction of server memory. $r_i$ is an input constant indicating the average query arrival rate (i.e., throughput) of the tenant I, and $e_i$ is the average query execution time of the tenant i. The average execution time is a function in buffer size and warmness level, and the function may be determined by the profile of the tenant. For example, for illustrative purposes, assume that there are only two warmness levels (either 100% warm or 0% warm). In one embodiment, the tenant I is 100% warm if and only if no other tenants run on the same DBMS instance (i.e., if and only if $\Sigma_i x_{ij}=1$, where j is the DBMS instance of the tenant i), otherwise, the tenant I is 0% warm.

In one embodiment according to the present principles, number of servers employed is based on the above-mentioned constraints from MINLP-1. The first two constraints state that each tenant is assigned to one and only one database instance, and each database instance is assigned to one and only one server. The third constraint counts a server as used if it hosts at least one database instance. The fourth constraint states that the total memory assigned to all database instances on a server is no more than the server memory size. The fifth constraint states that the total load of a server is no more than 1. For illustrative purposes, assume that each server has only one disk, and thus the load of each tenant is computed as the average query arrival rate times the average query execution time of the tenant. In one embodiment, MINLP-1 may implemented in A Mathematical Programming Language (AMPL), and solved using Couenne on NEOS. While MINLP-1, implemented in AMPL, and solved using Couenne on NEOS, is advantageously employed to minimize the number of servers employed according to the present principles, it is contemplated that other sorts of methods and systems may also be employed in accordance with the present principles.

In one embodiment according to the present principles, a tenant synthesizer module 530 is employed to generate synthetic tenant profiles. For each synthetic tenant the present system/method generates: (1) a random mixture of TPC-H queries that constitute the workload of the tenant, (2) a random data size, and (3) a feasible random throughput value. The profile of each tenant is generated from its query mixture and data size, and then computed profile is employed to determine the range of feasible throughput values from which random throughput values of the tenant are selected.

In one embodiment, two approaches to compute the profile of a tenant from its random query mixture and random data size are employed. An overview which briefly explains the two approaches informally is as follows. In the first approach, individual TPC-H queries on a database with 1 gigabytes of data are profiled, a random TPC-H query mixture for each tenant is generated, the profile of each tenant is computed from the profiles of its query mixture, a random data size for each tenant is generated, and the profile of the tenant is scaled according to its random data size. This approach allows for the selection of arbitrary data sizes, without having to re-profile TPC-H queries for each random data size generated. However, the scaling the profiles of tenants generates profiles that do not correspond to real measurements.

In a second approach implemented according to one embodiment of the present principles, a small set of data sizes is defined, individual TPC-H queries on each of these data sizes are profiled, a random query mixture for each tenant is generated, a random data size for each tenant from the predefined set of data sizes is selected, and then the profile of each tenant is computed from the profiles of its query mixture that correspond to the data size of the tenant. This approach generates tenants with profiles that correspond to real measurements according to one embodiment, and the data size of each tenant is selected from a small set of data sizes. While the tenant synthesizer module is advantageously implemented using one of the methods discussed above, it is contemplated that other sorts of methods may also be employed in accordance with the present principles. The process of tenant synthesis using the tenant synthesizer module 530 according to one embodiment is explained in further detail below.

In one embodiment according to the present principles, a set D of data sizes is defined, and for each data size d∈D, a TPC-H database with data size d is created. On each of these TPC-H databases, TPC-H query templates are profiled as follows. Let H be the set of all query templates in the TPC-H benchmark. For each template h∈H, a set of queries $Q_h$ are generated by assigning random values to the parameters of h, and then $Q_h$ is employed as input to the profiler to generate a profile of h. The profile of the template h is a function $p_h(d, b, w)$ that returns the average query execution time of h when run on a database with a data size d, a buffer size b, and a cache warmness level w.

In one embodiment according to the present principles, after profiling all templates in H, two sets of synthetic tenants, $T_{real}$ and $T_{scaled}$, are generated. First, the set $T_{real}$ will be discussed in detail according to one embodiment. For each tenant t∈$T_{real}$ a data size $d_t$ is randomly selected from the set D. A random query mixture is also generated for t by tossing a fair coin for each template h∈H to decide whether t uses h or not. In one embodiment, let $H_t$ denote the set of TPC-H queries used by t. The profile $P_t$ of the tenant t is computed as follows. For each buffer size b, and each warmness level w, $p_t(b, w)$ is set to the average of the profiles of all templates in $H_t$ with a data size of $d_t$, a buffer size of b, and a warmness level of w; that is, $p_t(b, w) = \Sigma_{h \in H_t} p_h(1, b, w)/|H_t|$.

Next, the set $T_{scaled}$ will be discussed in detail according to one embodiment of the present principles. In one embodiment, for each tenant, $t \in T_{scaled}$ we randomly pick a data size $d_t$ following an exponential distribution whose mean $\lambda$ is an input parameter to the tenant synthesizer. A random query mixture is also generated for t by tossing a fair coin for each template h∈H to decide whether t uses h or not. Let $H_t$ denote the set of TPC-H queries used by t. The profile $p_t$ of the tenant t is generated as follows. For each buffer size b, and each warmness level w, we set $p_t(d_t \cdot b, w)$ to $d_t$ times the average of the profiles of all templates in $H_t$ with, for example, a data size of 1 gigabytes, a buffer size of b, and a warmness level of w; that is, $p_t(d_t \cdot b, w) = d_t \cdot \Sigma_{h \in H_t} p_h(1, b, w)/|H_t|$.

In one embodiment according to the present principles, a feasible SLA throughput value $r_t$ is generated for each tenant t as follows. For illustrative purposes, let $e_t^{min} = \min_{b,w}\{p_t(b, w)\}$ and assume that $p_t$ is monotonically non-decreasing. Since it is assumed that $p_t$ is monotonically non-decreasing, $e_t^{min}$ may be achieved when b and w are maximum. Similarly, for further illustrative purposes, let $e_t^{max} = \max_{b,w}\{p_t(b, w)\}$, which is achieved when b and w are minimum. In one embodiment, the present system generates a throughput value $r_t$ that the tenant t can satisfy, thus $1/e_t^{min}$ is the maximum value of $r_t$. In one embodiment, a random average query execution time, $e_t^{rand}$, is generated uniformly from the range $[e_t^{min}, C \cdot e_t^{max}]$, where C is our coldness factor, and $r_t$ is set so that $r_t = 1/e_t^{rand}$. The coldness factor may be a parameter to the tenant synthesizer, whose value is no less than $e_t^{min}/e_t^{max}$, and that is employed to push the average throughput of tenants lower or higher. While creation and employment of a tenant synthesizer is illustratively shown, it is contemplated that other sorts of creation and employment means may also be used in accordance with the present principles.

Having described preferred embodiments of a system and method for SLA-aware database consolidation using per-tenant memory size configuration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for consolidating workload on one or more computing devices, comprising:
    generating tenant performance profiles for at least one of a buffer memory size and a buffer warmness;
    assigning one or more tenants to a database management system (DBMS) instance;
    configuring the one or more tenants to minimize a total server count needed to host the one or more tenants;
    reducing the total server count by adjusting of buffer sizes while satisfying Service Level Agreement (SLA) requirements;
    packing tenants as a two-dimensional vector packing problem (2-DVPP) where each tenant is represented by a 2-dimensional vector whose first dimension is a buffer size, and whose second dimension is a load; and
    determining a minimum number of servers needed by determining a memory assignment function which assigns a buffer size to each tenant such that the optimum output of the tenant placement 2-DVPP is minimized; and
    packing of tenants into servers, where buffer sizes m* of tenants are determined by a memory assignment function m $$m^* = \underset{m}{\operatorname{argmin}}\{\text{Opt\_2DV } P(m)\}$$

2. The method as recited in claim 1, further comprising adjusting of a private buffer size to achieve server count reduction.

3. The method as recited in claim 1, further comprising buffer sharing among two or more tenants and adjusting of a shared buffer size to achieve server count reduction.

4. The method as recited in claim 1, further comprising restricting the one or more tenants running on each disk to one tenant at a time.

5. The method as recited in claim 1, further comprising employing multiple database management system (DBMS) instances on a same server to impose controlled boundaries between buffer pools of different tenants or groups of tenants.

6. A system for consolidating workload on one or more computing devices, comprising:
    a profiler configured to generate tenant performance profiles, using a processor, for at least one of a buffer memory size and a buffer warmness;
    one or more tenants assigned to a database management system (DBMS), the one or more tenants configured to minimize a total server count needed to host the one or more tenants, wherein tenants are packed as a two-dimensional vector packing problem (2-DVPP) where each tenant is represented by a 2-dimensional vector whose first dimension is a buffer size, and whose second dimension is a load;
    code for determining a minimum number of servers needed by determining a memory assignment function which assigns a buffer size to each tenant such that the optimum output of the tenant placement 2-DVPP is minimized;
    one or more buffer pools configured to reduce the total server count through optimization of buffer sizes while satisfying Service Level Agreement (SLA) requirements; and
    packing of tenants into servers, where buffer sizes m* of tenants are determined by a memory assignment function m $$m^* = \underset{m}{\operatorname{argmin}}\{\text{Opt\_2DV } P(m)\}$$

7. The system as recited in claim 6, further comprising a buffer configured to adjust a private buffer size to achieve server count reduction.

8. The system as recited in claim 6, further comprising a buffer configured to adjust a shared buffer size and to share the buffer among two or more tenants to achieve server count reduction.

9. The system as recited in claim 6, further comprising one or more disks configured to restrict the one or more tenants running on each disk to one at a time.

10. The system as recited in claim 6, further comprising a server configured to impose controlled boundaries between buffer pools of different tenants or groups of tenants by employing multiple database management system (DBMS) instances on the same server.

\* \* \* \* \*